United States Patent [19]

Glaab

[11] Patent Number: 4,546,387

[45] Date of Patent: Oct. 8, 1985

[54] CIRCUIT FOR PROVIDING ACCURATELY SPACED VIDEO AND SOUND CARRIERS

[75] Inventor: Joseph B. Glaab, New Hope, Pa.

[73] Assignee: General Instrument Corporation, New York, N.Y.

[21] Appl. No.: 439,227

[22] Filed: Nov. 4, 1982

[51] Int. Cl.⁴ .............................................. H04N 7/06
[52] U.S. Cl. .................................... 358/186; 358/143; 358/197
[58] Field of Search ................ 358/186, 197, 86, 141, 358/143, 144; 455/3.4, 7, 17, 102

[56] References Cited

U.S. PATENT DOCUMENTS 2,858,369 10/1958 Kahn ..................................... 358/186
4,354,200 10/1982 Haenen ................................ 358/186

Primary Examiner—Tommy P. Chin
Attorney, Agent, or Firm—Hopgood, Calimafde, Kalil, Blaustein & Judlowe

[57] ABSTRACT

A circuit for producing two carrier frequencies (e.g. video and audio) spaced by an accurately controlled, predetermined frequency includes a common reference oscillator connected in two phase-locked loops. Each of the phase-locked loops includes a voltage-controlled oscillator adapted to produce an output signal at one of the carrier frequencies, and a phase detector for comparing a different predetermined fraction of the outputs of the voltage-controlled oscillators in each of the loops with a predetermined fraction of the output frequency of the reference oscillator.

17 Claims, 1 Drawing Figure

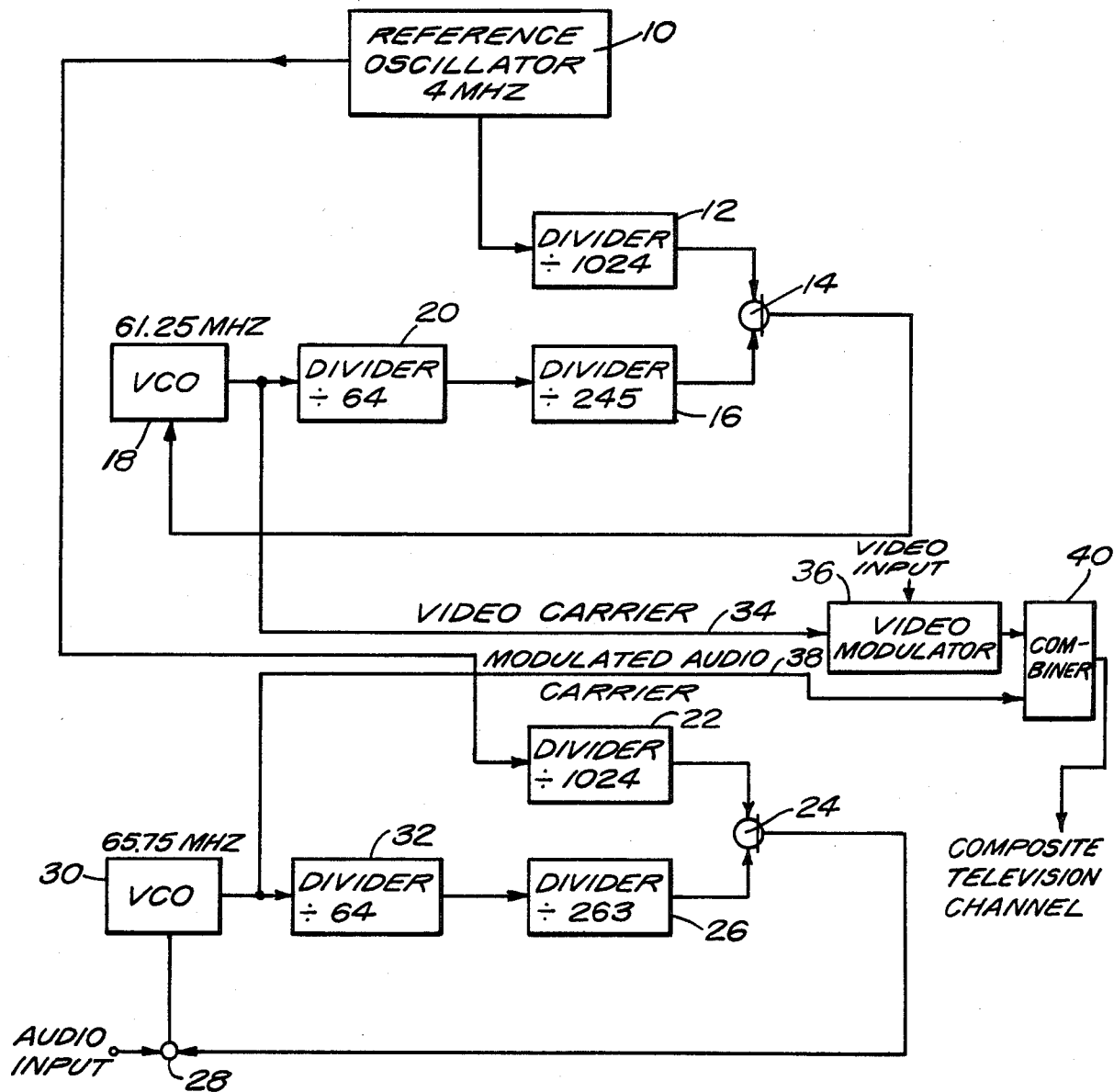

CIRCUIT FOR PROVIDING ACCURATELY SPACED VIDEO AND SOUND CARRIERS

The present invention relates to a circuit for providing carrier signals which are separated in frequency by a predetermined amount.

BACKGROUND OF THE INVENTION

In a conventional cable television converter the incoming television signal, which includes both video- and audio-modulated carriers for each channel, is subjected to a dual-conversion process, by means of which the incoming signal is first converted to an intermediate-frequency signal, and then in a second step this intermediate-frequency signal is converted to an output frequency corresponding to that of a locally unused television channel, typically channel 3. In accordance with FCC regulations, the video and audio carriers for each channel must be accurately separated by 4.5 MHz at a narrow tolerance of ±1 KHz.

In various applications, such as in pay television cable systems, the incoming video and audio signals are demodulated in the converter to baseband frequencies to permit the video and audio signals to be descrambled and, in some instances, to allow the volume of the audio signal to be remotely controlled. After the audio and video signals have been descrambled, they modulate audio and video carriers which are internally developed at the converter. The thus modulated reconstituted audio and video carriers are then mixed or combined and applied to the subscriber's television receiver at the preselected unused channel.

In order to meet the aforementioned FCC spacing requirements between the audio and video carriers, the restored or remodulated video and audio carriers must be accurately spaced by 4.5 MHz±1 KHz. In the conventional arrangement the modulated audio carrier, which is an FM signal, is generated by a free-running, variable-frequency LC oscillator and the video carrier is typically generated by a crystal oscillator. The known circuits used to generate the video and audio carriers are, however, not able to reliably maintain the ±1 KHz tolerance in the required 4.5 MHz spacing between these carriers, largely because these circuits are not stable with respect to temperature and time. There thus exists a need for a circuit which is capable of producing two radio-frequency signals accurately and reliably spaced in frequency from one another with a narrow tolerance, in the order of ±1 KHz, such as for use as audio and video carriers in a cable pay-television converter, and which can be fabricated at a moderate cost.

It is therefore an object of the invention to provide a circuit for producing two carrier signals which are accurately separated by a predetermined frequency.

It is a further object of the invention to provide a circuit of the type described in which accurate spacing of two carrier signals can be achieved in a circuit employing a single low-cost crystal.

It is an additional object of the present invention to provide a low-cost circuit for use in a pay-television converter in which the FCC-required precise tolerance in the spacing between the audio and video carriers is reliably attained.

SUMMARY OF THE INVENTION

To these ends, the present invention is directed to a circuit for producing two carrier frequencies (e.g., video and audio) spaced by a predetermined frequency. The circuit includes a reference oscillator connected as part of first and second phase-locked loops. Each of the phase-locked loops includes a variable-frequency oscillator adapted to produce an output at one of the carrier frequencies, and means for operatively comparing the output of the variable oscillator in the phase-locked loop with the output frequency of the reference oscillator and for controlling the frequency of the oscillator in response to that comparison.

BRIEF DESCRIPTION OF THE DRAWING

To the accomplishment of the above and to such further objects as may hereinafter appear, the present invention relates to a circuit for producing frequency-separated carrier signals substantially as defined in the appended claims, and as described in the accompanying drawing in which the single FIGURE is a schematic block diagram of a circuit embodying the principles of the invention.

DESCRIPTION OF THE PREFERRED EMBODIMENT

Referring to the FIGURE, the circuit of the invention comprises a reference oscillator 10, which is connected in two phase-locked loops, which respectively produce two separate signals at accurately spaced different frequencies. In the embodiment shown in the FIGURE, crystal oscillator 10 produces an output frequency nominally at 4 MHz, it being understood that this frequency and other frequencies specified in the following description of the invention are exemplary and not limiting of the invention. The output of oscillator 10 is applied to a frequency divider 12, which, in the embodiment shown, divides the input by a factor of 1,024, it being further understood that this division factor as well as others specified in the following description are also exemplary and not intended to be limiting of the invention.

The output of frequency divider 12 is applied as one of the inputs to a phase detector 14, the other input of which is the output of a frequency divider 16, which, in the disclosed embodiment, divides the frequency at its input by a factor of 245. The phase detector 14 compares the frequency and phase of the signals at the outputs of dividers 12 and 16 and produces at its output a signal (voltage) which is related to the difference (if any) between those frequencies.

The output of phase detector 14 is applied to the control input terminal of a video carrier voltage-controlled oscillator (VCO) 18 and is effective to control the frequency of the signal produced by oscillator 18, which, in the embodiment shown, is nominally at 61.25 MHz. The output of oscillator 18 is applied to a prescaler frequency divider 20, the output of which is applied to the input of divider 16. In the embodiment shown, divider 20 divides the frequency at its input by a factor of 64.

The output of reference oscillator 10 is also applied as an input to a frequency divider 22, which divides the input frequency by a factor of 1,024. The output of divider 22 is applied as one input of a phase detector 24, the other input of which receives the output of a frequency divider 26, which, in the embodiment shown, divides the frequency at its input by a factor of 263. Phase detector 24 compares the frequency and phase of the outputs of frequency dividers 22 and 26, and produces a voltage signal at its output that is related to any difference in those frequencies.

The voltage output of phase detector 24 is applied along with an audio input signal to the inputs of a summer 28, the output of which is applied to the control terminal of an audio carrier voltage-controlled oscillator (VCO) 30, which is designed to produce a frequency-modulated output signal at a nominal center frequency of 65.75 MHz, or 4.5 MHz higher than the video carrier output of VCO 18. The output of oscillator 30 is applied to the input of a prescaler frequency divider 32, which, in the embodiment shown, divides the input frequency by a factor of 64. The output of divider 32 is, in turn, applied to the input of frequency divider 26.

The output of oscillator 18 on a line 34 is the video carrier, which is modulated in a video modulator 36 by a video signal, such as one previously derived or demodulated from an incoming television signal. The thus-modulated video carrier is combined with the modulated audio carrier output of oscillator 30, which appears on a line 38, in a combiner 40 to produce at the output of the latter a reconstituted or composite television signal in which the carrier frequencies of the modulated audio and video carriers are accurately spaced. If desired, the output of the combiner may be passed through a filter (not shown) to remove the vestigial sidebands from the composite television signal.

It will be appreciated from the foregoing description of the circuit illustrated in the FIGURE that oscillator 10, frequency dividers 12, 16 and 20, phase detector 14, and voltage-controlled oscillator 18 constitute a first, or in this case, video carrier phase-locked loop, whereas reference oscillator 10, frequency dividers 22, 26 and 32, voltage-controlled oscillator 30, and phase detector 24 constitute a second, or, in this case, audio carrier phase-locked loop.

In operation of the circuit, when the frequency of the reference oscillator 10 is at its nominal frequency of 4 MHz, the output frequency of dividers 12 and 22 will both be at a frequency of 3,906.25 Hz. In the event that the output frequency of either oscillator 18 or 30 is different from its nominal output frequency (61.25 MHz or 65.75 MHz, respectively), the output frequency of divider 16 or 26 will deviate from 3,906.25 HZ by an amount proportional to the frequency deviation. This difference in frequency will be detected at the appropriate phase detector 14 or 24 to provide a corresponding error signal to the appropriate voltage-controlled oscillator 18 or 30, thereby to modify the frequency of the signal produced in that oscillator to tend to modify the frequency of the voltage-controlled oscillator toward its desired nominal frequency of 65.75 MHz or 61.25 MHz, thereby maintaining the audio and video carriers at their desired frequencies.

In the event of a deviation in the frequency of reference oscillator 10, the frequencies of voltage-controlled oscillators 18 and 30 will deviate by a proportional amount and the spacing between these two frequencies will also vary but by a lesser percentage than the change in the frequency of the reference oscillator. That is, the deviation in the spacing between the video and audio carrier frequencies will be equal to the deviation in the frequency of the reference oscillator 10 from its nominal frequency of 4 MHz multiplied by the ratio of the division factors of the two phase-locked loops, here 263/245 or 1.073. However, since the frequency of the reference oscillator, here 4 MHz, is relatively low as compared to the video and audio carrier frequencies, the resultant deviation in the spacing between the audio and video carrier frequencies will, with the proper selection of reference oscillator frequency and frequency-division factors, be maintained with the ±1 KHz tolerance. Thus, for variations in the frequency of the reference oscillator by as much as 0.02 percent, the shifts in the spacing between the video and audio carriers, that is the output frequencies of voltage-controlled oscillators 18 and 30, will still remain with the prescribed ±1 KHz tolerance.

It will be further understood that although the specified frequency-division factors of the frequency dividers used in both phase-locked loops were exemplary, these factors are preferably selected such that the video and audio carrier frequencies, when divided by the division factors of the frequency dividers 16 and 26, respectively, yield a frequency of 250 KHz, the highest common integral divider of the conventional video carrier frequencies, as they do in the embodiment illustrated in the FIGURE.

It will also be understood that although the circuit of the invention herein described produces a video carrier at the channel 3 frequency of 61.25 MHz, the voltage-controlled oscillators and the frequency dividers in both phase-locked loops may be appropriately modified to produce a video (and correspondingly spaced audio) carrier frequency at another normally unused channel.

It will thus be understood that whereas the circuit of the invention has been hereinabove described with respect to a single, presently preferred embodiment, modifications in the circuit may be made without necessarily departing from the spirit and scope of the invention.

What is claimed is:

1. A circuit for producing a modulated audio carrier and a modulated video carrier at accurately spaced first and second respective different frequencies, said circuit comprising a first phase-locked loop for producing said modulated audio carrier signal, a second phase-locked loop for producing a video carrier signal, each of said first and second phase-locked loops including a common reference oscillator, said first phase-locked loop including means for combining an audio carrier signal with an audio input, thereby to form said modulated audio carrier, and further comprising second means for modulating said video carrier signal with a video input, thereby to form said modulated video carrier, and means for operatively combining said modulated audio and video carrier signals to produce a composite television signal including the frequency-spaced modulated audio and video carriers.

2. The circuit of claim 1, in which said first and second phase-locked loops respectively include first and second variable-frequency oscillators for respectively producing said audio and video carrier signals, and first and second comparison means for operatively comparing the frequencies of said first and second variable-frequency oscillators with a predetermined fraction of that of said reference oscillator.

3. The circuit of claim 2, in which said first and second phase-locked loops further comprise first and second frequency-divider means respectively operatively connected between said reference oscillator and said first and second comparison means.

4. The circuit of claim 3, further comprising third and fourth frequency-divider means operatively respectively connected between said first and second variable-frequency oscillators and said first and second comparison means.

5. The circuit of claim 4, in which said first, second, third, and fourth frequency-divider means each have a fixed frequency-division factor.

6. The circuit of claim 5, in which said first and second frequency-divider means respectively operatively connected between said reference oscillator and said first and second comparison means have the same preset division factor.

7. The circuit of claim 6, in which said third and fourth frequency-divider means operatively respectively connected between said first and second variable frequency oscillator and said first and second comparison means have different preset division factors.

8. The circuit of claim 5, in which said third and fourth frequency-divider means operatively connected between said first and second variable-frequency oscillators and said first and second comparison means each includes first and second pairs of series-connected frequency dividers, one of said frequency dividers in each of said divider pairs having a common division factor with a corresponding divider in the other divider pair, the other frequency divider in one of said divider pairs providing a different division factor than the other divider in the other of said divider pairs.

9. A circuit for producing first and second modulated signals spaced by a predetermined frequency from one another within a predetermined tolerance, said circuit comprising a reference oscillator, first and second variable-frequency oscillators respectively nominally adapted to produce output signals at first and second frequencies, first means for operatively comparing a predetermined fraction of the output frequency of said reference oscillator with the output frequency of said first variable-frequency oscillator and for varying the output frequency of said first variable-frequency oscillator in response to the operation of said first comparison means, second comparison means for operatively comparing the output frequency of said reference oscillator and the output frequency of said second variable-frequency oscillator and for varying the output frequency of said second variable-frequency oscillator in response to the operation of said second comparison means and first and second modulating means operatively coupled to said first and second modulated variable-frequency oscillators for providing said first and second modulated signals respectively, whereby the predetermined frequency spacing at said tolerance is maintained between said first and second modulated signals.

10. The circuit of claim 9, further comprising first and second frequency-divider means respectively operatively connected between said reference oscillator and said first and second comparison means.

11. The circuit of claim 10, further comprising third and fourth frequency-divider means respectively operatively connected between said first and second variable-frequency oscillators and said first and second comparsion means.

12. The circuit of claim 11, in which the output frequencies of said first and third frequency-divider means and of said second and fourth frequency-divider means are nominally equal.

13. The circuit of claim 12, in which said first, second, third, and fourth frequency-divider means each have a fixed frequency-division factor.

14. The circuit of claim 13, in which said first and second frequency-divider means respectively operatively connected between said reference oscillator and said first and second comparison means have the same fixed division factor.

15. The circuit of claim 14, in which said third and fourth frequency-divider means operatively respectively connected between said first and second variable frequency oscillators and said first and second comparison means have different preset division factors.

16. The circuit of claim 13, in which said third and fourth frequency-divider means operatively connected between said first and second variable-frequency oscillators and said first and second comparison means each include first and second pairs of series-connected frequency dividers, one of said frequency dividers in each of said divider pairs having a common division factor with a corresponding divider in the other divider pair, the other frequency divider in one of said divider pairs providing a different division factor than the other divider in the other of said divider pairs.

17. A circuit for producing first and second modulated carrier signals having a predetermined frequency spacing from one another at a narrow preset tolerance, said circuit comprising a reference oscillator, a first voltage-controlled oscillator for nominal operation at said first frequency, first and second frequency-divider means respectively operatively connected to said reference oscillator and to said first voltage-controlled oscillator to produce first and second nominally equal comparison frequencies, first phase-detection means operatively connected to the outputs of said first and second frequency divider means for detecting any difference in said first and second comparison frequencies and to produce a first error signal when said first and second comparison frequencies differ from one another, said first error signal being applied to said first voltage-controlled oscillator to vary the frequency thereof; a second voltage-controlled oscillator for nominal operation at said second carrier frequency, third and fourth frequency-divider means for respectively dividing the frequency of said reference oscillator and said second voltage-controlled oscillator to a second pair of nominally equal comparison frequencies, second phase-detection means for comparing said second pair of comparison frequencies and for producing a second error signal in the event said second pair of compairson frequencies differ from one another, said second error signal being applied to said second voltage-controlled oscillator to vary the frequency thereof, and first and second modulating means operatively coupled to said first and second voltage-controlled oscillators for providing said first and second modulated carrier signals respectively.

* * * * *